Patented Dec. 3, 1946

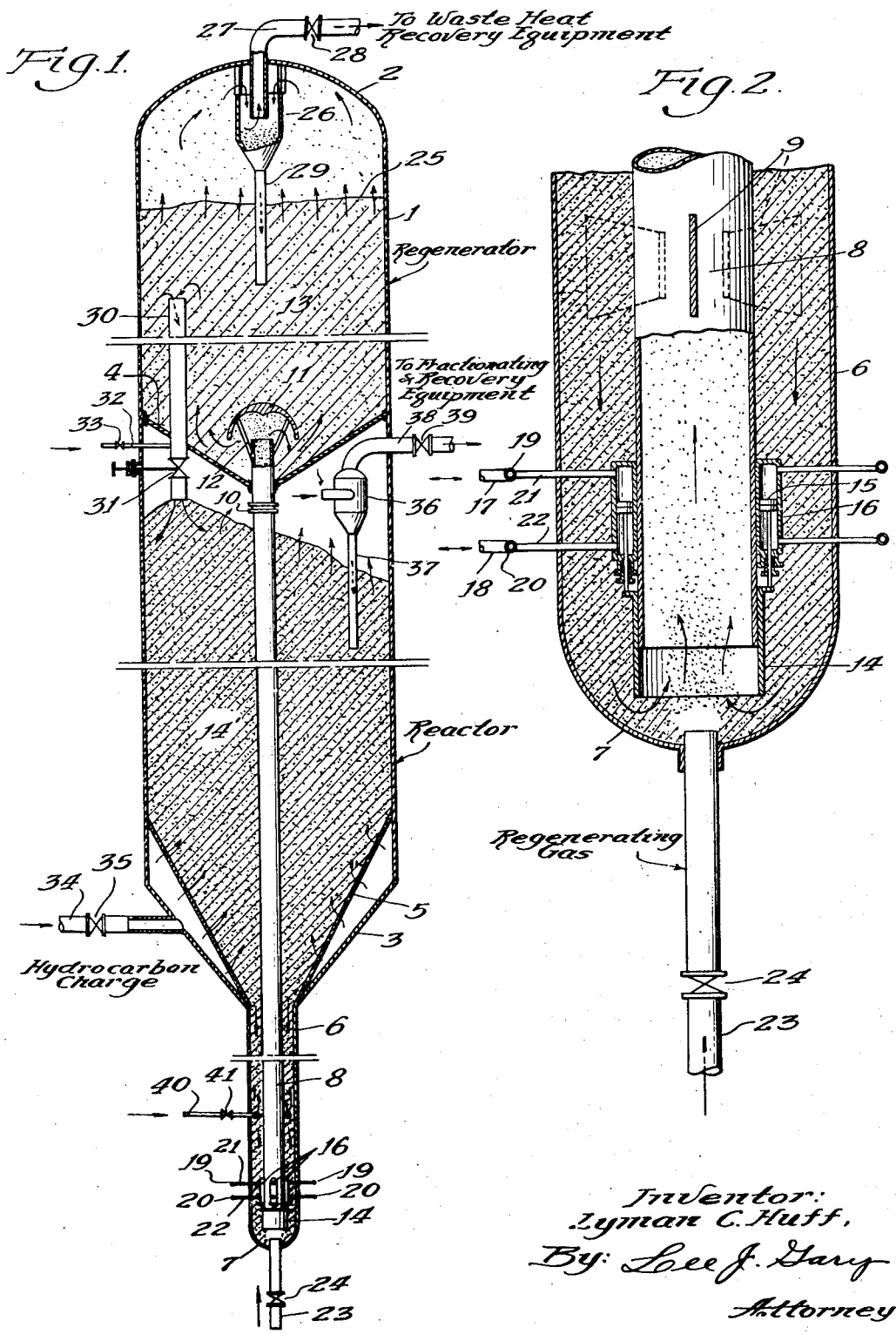

2,412,152

UNITED STATES PATENT OFFICE 2,412,152

METHOD AND MEANS FOR CONTACTING FINELY DIVIDED SOLID PARTICLES WITH FLUIDS

Lyman C. Huff, Chicago, Ill., assignor to Universal Oil Products Company, Chicago, Ill., a corporation of Delaware Application October 29, 1943, Serial No. 508,114

8 Claims. (Cl. 196—52)

This invention relates to an improved method and means for contacting finely divided solid particles with fluids and in particular to a method and means for conducting various hydrocarbon conversion reactions in which vapors or gaseous hydrocarbons are contacted with finely divided solid catalyst particles.

The present invention may be advantageously applied to various hydrocarbon conversion reactions in which catalysts are employed, such as cracking, dehydrogenation, aromatization, alkylation, reforming, and the like.

In the various hydrocarbon conversion processes coming within the scope of this invention, the catalyst particles during their contact with the reactant materials gradually become inactive due to the accumulation thereon of deleterious deposits. These deposits are hydrocarbonaceous in nature and are generally removed by combustion with air to restore the catalyst to a useful activity.

In order to maintain continuous processes for these various reactions, it is necessary to maintain a continuous cyclic flow of catalyst particles between the reaction zone and the combustion or regeneration zone. Several methods are now in use in the industry for accomplishing this transfer of catalyst particles between the two main zones of the process. For instance, in some processes conveyors and bucket elevators are employed, while in others gases or fluid carriers are used. However, in all known installations, a high degree of erosion of equipment and attrition of catalyst particles is now encountered.

The present invention offers means for substantially overcoming these two difficulties by a new and novel method.

Broadly, the present invention comprises a method of transferring finely divided solid particles from a lower zone to a higher zone by continuously passing said solid particles vertically downward from said lower zone, reversing the direction of flow of said solid particles by admixing them with a vertically upward flowing stream of fluid, and passing the resulting vertically upward flowing suspension of solid particles and fluid into said higher zone.

In a more limited embodiment, the present invention comprises a method of contacting finely divided solid particles successively with two gaseous fluids, which comprises maintaining two solid particle gaseous fluid contacting zones in vertical alignment and partitioned from each other, continuously passing solid particles vertically downward from the lower portion of the lower contacting zone, reversing the direction of flow of said solid particles by admixing them with a vertically upward flowing stream of gaseous fluid to be contacted in the upper contacting zone. Passing the resultant suspension vertically upward into the lower portion of said upper contacting zone wherein the upward velocity of the gaseous fluid will cause the maintenance of a lower dense solid particle gaseous fluid phase and an upper relatively dilute solid particle gaseous fluid phase, continually passing solid particles from the dense phase in the upper contacting zone into the upper portion of the lower contacting zone, thereby maintaining a continuous downward flow of solid particles therethrough withdrawing gaseous fluid from the dilute phase in the upper contacting zone, and passing a second gaseous fluid through the lower contacting zone in contact with the solid particles therein.

In the process of the present invention only one high velocity stream of mixed fluid and solid particles is employed and this stream moves in a single direction without bends or turns which might become eroded due to the abrasive action of the catalyst particles. The remainder of the transfer system carries streams of relatively low velocity and also in a substantially uni-directional flow without turns or bends.

In order to further illustrate the additional features and advantages of the invention, reference is made to the accompanying diagrammatic drawing and the following description thereof.

Figure 1 of the drawing illustrates in sectional elevation one particular type of equipment in which the process of the invention may be accomplished.

Figure 2 is an enlarged view of the lower end of the transfer conduit which forms a part of the equipment shown in Figure 1.

The apparatus here illustrated comprises a vertically elongated shell 1 closed at its upper end by head 2 and at its lower end by a conically shaped head 3. The shell is divided into two zones by means of a partitioning member 4 which is secured to the interior of shell 1 by welding or other suitable means. Spaced from lower head 3 is a perforate distribution member 5, the purpose of which will be hereinafter described.

Extending downwardly from head 3 is an elongated conduit 6 which terminates in a closure member 7. Disposed centrally within shell 1 and extending from adjacent member 7 through partition member 4 is a transfer conduit 8. Conduit 8 is supported within conduit 6 by means of suitable brackets 9 which are secured by welding or other suitable means and the upper end of conduit 8 is secured to partition member 4. To accommodate differential expansion between conduit 8 and shell 1 an expansion joint 10 is provided. A distribution cap 11 is attached to the upper end of conduit 8 by means of brackets 12 and serves to distribute upwardly flowing fluids and catalyst throughout the cross-sectional area of the upper contacting zone 13.

The lower end of conduit 6 is provided with a sliding cylindrical gate 14 which is powered by a plurality of pistons 15, fluid for motivating pistons 15 is supplied and withdrawn through conduits 17 and 18, headers 19 and 20, and branch conduits 21 and 22. By supplying fluid through conduit 17 and withdrawing fluid through conduit 18, slide 14 will be moved downwardly to restrict the flow of solid particles from conduit 6 into conduit 8, and by removing fluid through conduit 17 and introducing fluid through conduit 18 and slide 14 will be raised, thus opening the way for a greater flow of solid particles from conduit 6 into conduit 8.

To further illustrate the utility of the invention, its operation when employed for conducting a catalytic cracking reaction will now be described.

A moving body of catalyst particles, 14, is maintained in the lower contacting zone by continuously withdrawing some of said particles through conduit 6, the rate of withdrawal being regulated by means of slide 14. The withdrawn catalyst particles are then commingled with a stream of regenerating gases introduced through conduit 23 controlled by valve 24. The resulting solid particle gas suspension then passes through conduit 8 into the upper contacting zone 13. The upward velocity of the regenerating gas in zone 13 is such that two solid particle gas phases are formed and maintained. The lower phase is relatively dense having a cracking catalyst content of as much as 20 or 25 pounds per cubic foot. The upper extent of this dense phase is indicated by line 25. In the upper or light phase above the interface indicated by line 25, the catalyst concentration is sometimes less than one pound per cubic foot.

The effluent combustion products from the upper contacting zone pass through separator 26 wherein suspended catalyst fines are removed and the catalyst-free gases are withdrawn through line 27 controlled by valve 28 to be directed to suitable waste heat recovery equipment. The removed catalyst fines are returned to the dense zone by means of conduit 29.

In order to maintain a continuous flow of catalyst through the lower contact zone regenerated catalyst particles are continuously withdrawn from the dense phase in the upper zone by means of conduit 30 controlled by valve 31. A suitable stripping medium such as steam or inert gases may be introduced to conduits 6 and 30 by means of lines 40 and 32 controlled by valves 41 and 33 respectively.

The hydrocarbon charge, preferably in vapor form, is introduced to the system by means of conduit 34 controlled by valve 35 and enters the chamber between head 3 and distribution member 5. The charging material will pass through the perforations in member 5 and contact the catalyst in zone 14 to accomplish the desired reaction. The effluent reaction products pass through cyclone separator 36 wherein suspended fine particles are removed and returned to the system by means of conduit 37, the catalyst-free reaction products are then withdrawn through conduit 38 controlled by valve 39 to be directed to suitable fractionation and recovery equipment as desired.

It can be seen from the above description that the catalyst particles pass in a continuous cyclic flow through the system. The catalyst particles pass through the reaction zone to accomplish the desired reaction and accumulate the resulting carbonaceous deposit, then are withdrawn and transported into the regenerator where the carbonaceous deposit is removed by combustion. The reactivated catalyst is then transferred from the regenerator to the reactor to complete the circuit.

Suitable catalyst and operating conditions for the various processes which come within the scope of the invention have not been described in detail herein because they are well known in the art.

I claim as my invention:

1. A method of contacting finely divided solid particles successively with two fluids which comprises maintaining two solid particle fluid contacting zones in vertical alignment and partitioned from each other, continuously passing solid particles vertically downward in an annular column from the lower portion of the lower contacting zone, reversing the direction of flow of said solid particles by admixing them with a vertically upward flowing stream of fluid to be contacted in the upper contacting zone, passing the resultant mixture upwardly in straight line flow in a confined path extending vertically through said annular column and said lower zone, thereafter discharging said mixture into the lower portion of said upper contacting zone wherein the upward velocity of said fluid will cause the maintenance of a lower dense turbulent solid particle fluid phase and an upper relatively dilute solid particle fluid phase, continuously passing solid particles from the dense phase in the upper contacting zone into the upper portion of the lower contacting zone, thereby maintaining a continuous downward flow of solid particles therethrough, withdrawing fluid from the dilute phase in the upper contacting zone and passing a second fluid through the lower contacting zone in contact with the solid particles therein.

2. A process for the catalytic conversion of hydrocarbons which comprises maintaining two vertically aligned separate contacting zones, maintaining the lower of said contacting zones at conversion conditions and maintaining the upper of said contacting zones at regeneration conditions, moving a compact bed of finely divided catalyst particles downwardly through the lower contacting zone, continuously withdrawing said catalyst particles vertically downward in an annular column from the lower portion of said lower contacting zone in a vertically downward direction, reversing the direction of flow of said withdrawn catalyst particles by admixing them with a vertically upward flowing stream of regenerating gases, passing the resulting suspension upwardly in straight line flow in a confined path extending vertically through said annular column and said lower zone, thereafter discharging said suspension into the upper contacting zone wherein the upward velocity of the gases will cause the maintenance of a lower dense turbulent catalyst particle gas phase and an upper relatively dilute catalyst particle gas phase, continuously passing catalyst particles from said dense phase into the upper portion of the lower contacting zone, withdrawing combustion products from said dilute phase, passing hydrocarbons into and through the lower contacting zone in contact with the catalyst particles moving therethrough, and withdrawing reaction products from said lower contacting zone.

3. A method for contacting a subdivided solid successively with two fluids which comprises maintaining a bed of subdivided solid particles in each of two contacting zones disposed in vertical alignment, passing one of said fluids through the bed in the lower of said zones, continuously discharging solid particles from the upper of said zones onto the top of the bed in said lower zone and withdrawing solid particles vertically downward in an annular column from the lower portion of said lower zone, thereby maintaining a downward movement of the solid particles of the bed in the lower zone, reversing the direction of flow of the particles withdrawn from the lower zone by commingling the same with a vertically upward flowing stream of the other of said fluids, passing the resultant mixture upwardly in straight line flow in a confined path extending vertically through said annular column and the bed in said lower zone and then discharging the same into the lower portion of the upper zone at sufficient velocity to maintain the bed in the last-mentioned zone in turbulent condition.

4. A process for the catalytic conversion of hydrocarbons which comprises maintaining a bed of subdivided solid catalyst particles in a lower reaction zone and in an upper regenerating zone disposed in vertical alignment, passing the hydrocarbons at conversion temperature through the catalyst bed in the lower reaction zone, continuously discharging regenerated catalyst particles from the upper regenerating zone onto the top of the catalyst bed in the reaction zone and withdrawing contaminated catalyst particles vertically downward in an annular column from the lower portion of the reaction zone, thereby maintaining a downward movement of the catalyst particles of the bed in the reaction zone, reversing the direction of flow of the particles withdrawn from the reaction zone by commingling the same with a vertically upward flowing stream of oxygen-containing regenerating gas, passing the resultant mixture upwardly in straight line flow in a confined path extending vertically through said annular column and the bed in the reaction zone and then discharging the same into the lower portion of the regenerating zone at sufficient velocity to maintain the bed in the last-mentioned zone in turbulent condition, and burning carbonaceous matter from the catalyst particles forming the turbulent bed in the regenerating zone.

5. An apparatus of the class described comprising a vertically elongated shell, partitioning means dividing the shell into an upper contacting zone and a lower contacting zone, means for maintaining a bed of solid particles in each of said zones, fluid inlet and outlet means for said lower zone, a discharge conduit for solid particles extending vertically downward from the bottom of said shell and communicating with said lower zone, an open-ended vertical conduit extending from the lower portion of said discharge conduit through the lower contacting zone and said partitioning means into the upper contacting zone, a fluid inlet at the lower end of said discharge conduit and in communication with said open-ended conduit, a second open-ended vertical conduit disposed in said shell out of alignment with the first-named open-ended conduit and extending from a point within the upper contacting zone through said partitioning means into the upper portion of the lower contacting zone, and means for removing fluid from said upper zone.

6. In the catalytic conversion of hydrocarbons wherein a stream of the hydrocarbons is contacted under conversion conditions with subdivided solid catalyst particles in a contacting zone and resultant contaminated catalyst particles contacted with a stream of oxygen-containing gas under combustion conditions in a separate contacting zone disposed in vertical alignment with respect to the first-named contacting zone, the method which comprises transferring catalyst particles from the upper to the lower of said contacting zones, withdrawing catalyst particles vertically downward in an annular column from the lower portion of said lower zone, simultaneously passing one of said streams upwardly in straight line flow in a confined path extending vertically through said annular column and said lower zone, suspending the catalyst particles of said annular column in said upwardly flowing stream, and discharging the resultant suspension from said confined path into said upper contacting zone.

7. The method as defined in claim 6 further characterized in that the hydrocarbons are contacted with the catalyst particles in said lower zone and in that the stream of oxygen-containing gas is passed upwardly in said confined path and then into the upper contacting zone.

8. An apparatus of the class described comprising an upper contacting chamber and a lower contacting chamber disposed in vertical alignment, means for maintaining a bed of solid particles in each of said chambers, fluid inlet and outlet means for said lower chamber, a discharge well for solid particles extending downward from the lower end of said lower chamber, an open-ended vertical conduit extending from the lower portion of said discharge well through the lower contacting chamber into the upper contacting chamber, a fluid inlet at the lower end of said discharge well and in communication with said open-ended conduit, a second open-ended vertical conduit connecting said upper chamber with said lower chamber and disposed out of alignment with the first named open-ended conduit and extending from a point within the upper contacting chamber into the upper portion of the lower contacting chamber, and means for removing fluid from said upper chamber.

LYMAN C. HUFF.